UNITED STATES PATENT OFFICE.

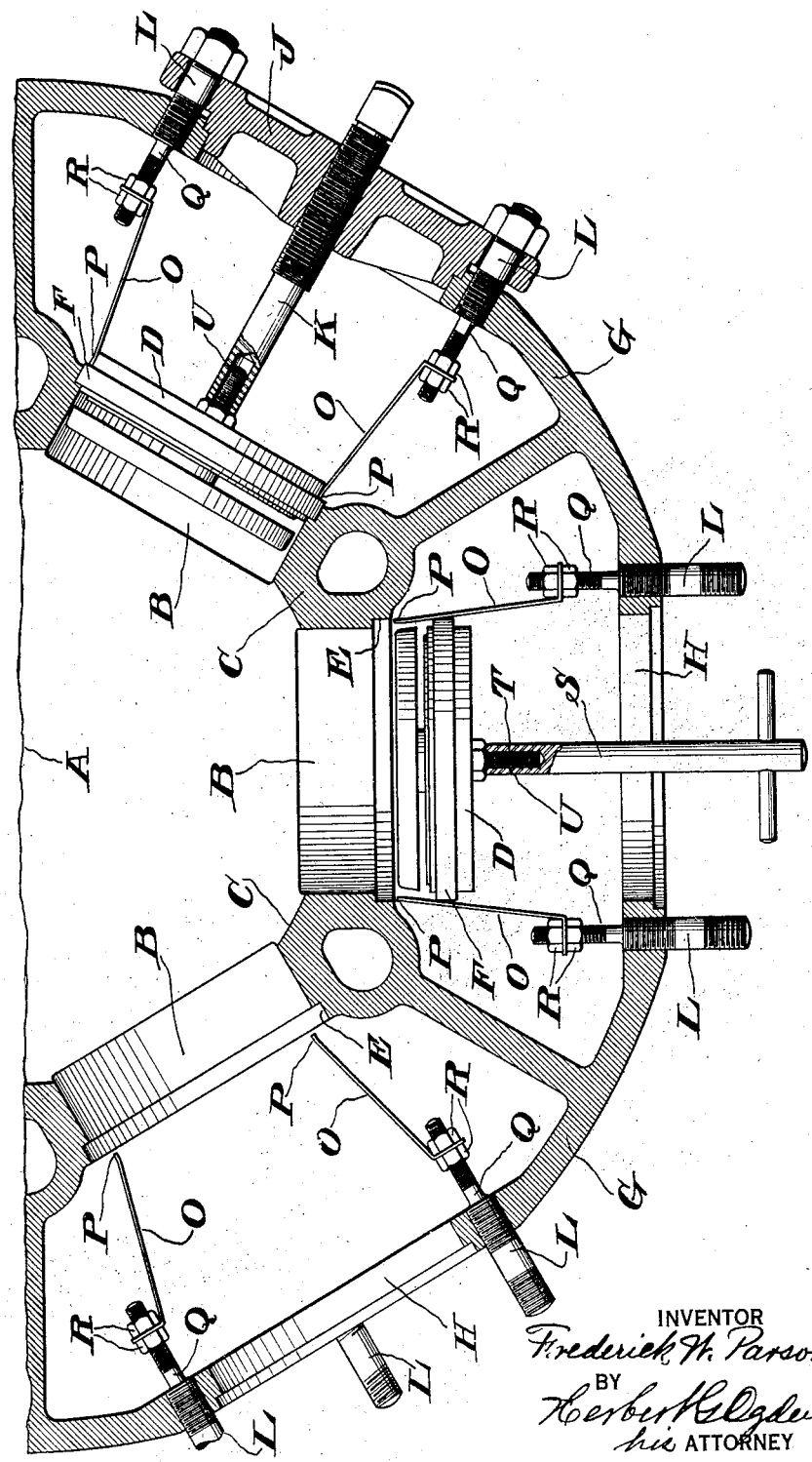

FREDERICK W. PARSONS, OF ELMIRA, NEW YORK, ASSIGNOR TO INGERSOLL-RAND COMPANY, OF JERSEY CITY, NEW JERSEY, A CORPORATION OF NEW JERSEY.

VALVE-SEAT RETAINER.

1,385,467.

Specification of Letters Patent.   Patented July 26, 1921.

Application filed November 9, 1920.   Serial No. 422,977.

*To all whom it may concern:*

Be it known that I, FREDERICK W. PARSONS, a citizen of the United States, and a resident of Elmira, county of Chemung, State of New York, have invented certain new and useful Improvements in Valve-Seat Retainers, of which the following is a specification.

This invention relates to compressors but more particularly to valve seat retaining devices for retaining the valve seats and valves in position in the valve openings in the inner wall of the compressor head until the covers and valve securing devices are adjusted on the outer wall or shell of the compressor head.

In a compressor head in which the valves, as for instance, plate valves are arranged radially about the longitudinal axis of the head, difficulty has been experienced in temporarily retaining or supporting the valve seats carrying valves in the valve openings on the lower side of the head, while the covers and permanent valve seat holding devices, usually in the form of studs passing through the covers, are being adjusted in position and secured in place.

These valve seats and valves lying below the plane of the horizontal axis of the machine tend to fall outwardly and downwardly while the covers are being adjusted and in practice, one method is to loosely secure the valves to the valve securing cover studs, and adjust the valves and covers at the same time, but with valves of large diameter in particular, the adjustment of the valve seat and valve in its opening may not be accurate so that leakage or other more serious troubles result. Again the workman cannot see what he is doing, since the cover obscures his view through the outer cover opening in the head, and for this reason he may not set the valve seat accurately in the inner opening.

The primary object of the present invention is to enable the valve seats to be accurately adjusted and temporarily retained in the valve seat openings, particularly in the under side of the inner wall of the head while the covers are removed so that the workman can plainly see the adjustment, and may afterward secure the covers and permanent valve securing devices in position without disturbing the adjustment already made.

Further objects of the invention will hereinafter appear and to all of these ends the invention consists of the combinations of elements fully described and claimed in this specification and illustrated in one of its preferred forms in the accompanying drawing, which is a diagrammatic transverse sectional view through the lower half of a compressor head showing my valve seat retainer in use.

Referring to the drawings, a type of compressor head A is shown suitable for illustrating the advantages and mode of operation of my device, and I have only chosen to show the lower half of the head for simplicity, it being understood however, that the invention may be used with any type of head to which it is found applicable.

The head illustrated is provided with the usual valve seat openings B in the inner wall C adapted to receive the valve seats D in this instance adapted to carry plate valves of any suitable type. The openings B as shown are provided with the rabbeted or counterbored portion E for seating the flanges F of the valve seats D. The valves shown are inlet valves, but the invention applies equally to either inlet or discharge valves.

The outer wall G of the head is provided with openings H corresponding to the openings B and the usual covers J, of which only one is shown, are provided for closing the outer openings after the valve seats and valves are in place. Adjustable holding devices preferably in the form of studs K pass through each cover for securing the valve seats in final position and cover holding means which may be in the form of studs L are provided on the outer wall. In order to temporarily maintain the valve seats D in the openings B, with the covers removed, I conveniently support spring retaining fingers or strips of metal O from the inside of the outer wall G in such position that they extend through the inlet or discharge space between the walls as the case may be, into proximity to the openings B and preferably approximated at opposite sides of each opening B, with the inner ends P of the fingers terminating in front of the openings in position to spring over the flange F of a valve seat and retain the valve seat in place, as the seat is inserted between the spring fingers into one of the openings B.

The spring fingers may be suitably secured to the inner extensions Q of the cover studs L as by means of the nuts R and two opposite spring fingers for each opening B have been found to be sufficient, although for the larger sizes of valves more may be provided if desired. A handle S, having a socket T adapted to be placed over the valve stud U may conveniently be used for inserting a valve, and then this handle is withdrawn and the cover J and valve securing stud K adjusted in position. To remove a valve after the cover has been removed, the spring fingers may be forced apart by hand or by any suitable means, in order to disengage the springs from the valve seat flange.

My valve seat retainer is obviously simple in construction, cheap to manufacture, readily fitted to standard compressors, does not interfere with the operation of the valves or flow of fluid being compressed, and has been found to operate satisfactorily and well in actual practice.

I claim:

1. In a compressor, a compressor head having a valve seat opening in its inner wall adapted to receive a valve seat carrying a valve, the outer wall of the head having a corresponding opening adapted to be closed by a cover carrying an adjustable valve securing device, and spring fingers supported from inside the outer wall adjacent the cover opening and extending into proximity to the valve seat opening in the inner wall for retaining a valve seat in position in the valve seat opening until the cover and valve securing device are adjusted.

2. In a compressor, a compressor head having valve seat openings in its inner wall adapted to receive valve seats carrying valves, the outer wall of the head having corresponding openings, covers for closing said outer openings after the valve seats and valves are in place, adjustable holding studs passing through said covers for securing the valve seats in position, studs for holding the covers in position, and spring retaining fingers extending inwardly from opposite cover holding studs into proximity to the said valve seat openings for retaining the valve seats in position in the said openings while the covers and valve securing studs are being adjusted.

3. In a compressor, a compressor head having a valve seat opening in its inner wall adapted to receive a valve seat carrying a valve, the outer wall of the head having a corresponding opening, a cover for closing said outer opening, an adjustable valve securing stud passing through said cover, studs for holding the cover in position, and spring retaining fingers extending inwardly from opposite cover holding studs into proximity to the said valve seat opening for retaining the valve seat in position in said opening while the cover and valve securing studs are being adjusted.

In testimony whereof I have signed this specification.

FREDERICK W. PARSONS.